United States Patent

Hanes

(10) Patent No.: US 10,051,367 B2
(45) Date of Patent: Aug. 14, 2018

(54) PORTABLE SPEAKER

(71) Applicant: Hewlett-Packard Development Company, L.P., Houston, TX (US)

(72) Inventor: David H. Hanes, Loveland, CO (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 0 days.

(21) Appl. No.: 15/310,582

(22) PCT Filed: May 27, 2014

(86) PCT No.: PCT/US2014/039502
§ 371 (c)(1),
(2) Date: Nov. 11, 2016

(87) PCT Pub. No.: WO2015/183234
PCT Pub. Date: Dec. 3, 2015

(65) Prior Publication Data
US 2017/0078795 A1    Mar. 16, 2017

(51) Int. Cl.
*H04R 3/04* (2006.01)
*H04R 5/04* (2006.01)

(52) U.S. Cl.
CPC ............... *H04R 3/04* (2013.01); *H04R 5/04* (2013.01); *H04R 2227/005* (2013.01); *H04R 2420/07* (2013.01); *H04R 2430/01* (2013.01)

(58) Field of Classification Search
None
See application file for complete search history.

(56) References Cited

U.S. PATENT DOCUMENTS

| 7,899,389 | B2 | 3/2011 | Mangum |
| 9,014,832 | B2* | 4/2015 | Amidon ............ H04L 12/2809 700/94 |
| 2003/0061369 | A1* | 3/2003 | Aksu ................ H04L 29/06027 709/231 |

(Continued)

FOREIGN PATENT DOCUMENTS

KR    10-20130113571    10/2013

OTHER PUBLICATIONS

Goetz, G., "How to set up multiroom audio with AirPlay speakers and iTunes"; Jan. 18, 2014; 8 pages.

*Primary Examiner* — Curtis Kuntz
*Assistant Examiner* — Qin Zhu
(74) *Attorney, Agent, or Firm* — Wall & Tong LLP

(57) ABSTRACT

In one example, a portable speaker is provided. The portable speaker includes a communication interface to receive an audio file from a portable computing device, a machine-readable storage medium to store the audio file, a speaker to output sound corresponding to the audio file, and a management module. The management module is to (i) add the audio file to a queue to be output by the speaker; (ii) analyze the audio file to determine a baseline audio level for the audio file, and utilize the determined baseline audio level to normalize an audio level of another audio file subsequently added to the queue; and (iii) in response to the number of audio files in the queue decreasing below a threshold, analyze metadata from audio files previously or currently in the queue to determine attribute information, and request audio content from an Internet service provider based on the attribute information.

14 Claims, 4 Drawing Sheets

(56) References Cited

U.S. PATENT DOCUMENTS

| | | | |
|---|---|---|---|
| 2007/0061497 A1* | 3/2007 | Takatsuka | G11B 19/025 |
| | | | 711/100 |
| 2007/0136446 A1* | 6/2007 | Rezvani | G06F 17/30749 |
| | | | 709/219 |
| 2008/0039964 A1 | 2/2008 | Charoenruengkit et al. | |
| 2009/0271534 A1 | 10/2009 | Acosta et al. | |
| 2009/0319574 A1* | 12/2009 | Burgard | H04H 20/82 |
| 2009/0327222 A1* | 12/2009 | Spitzer-Williams | G06F 17/30029 |
| 2010/0228740 A1 | 9/2010 | Cannistraro et al. | |
| 2010/0235476 A1 | 9/2010 | Lin et al. | |
| 2010/0284389 A1* | 11/2010 | Ramsay | G06F 17/30017 |
| | | | 370/338 |
| 2013/0014232 A1* | 1/2013 | Louboutin | H04M 1/72527 |
| | | | 726/5 |
| 2013/0091054 A1 | 4/2013 | Nathan et al. | |
| 2013/0117309 A1* | 5/2013 | Klein, Jr. | G06F 17/30038 |
| | | | 707/771 |
| 2013/0254207 A1* | 9/2013 | Coburn, IV | G06F 3/01 |
| | | | 707/740 |
| 2014/0074924 A1* | 3/2014 | Yim | H04N 21/43637 |
| | | | 709/204 |
| 2014/0080469 A1* | 3/2014 | Ko | H04W 4/20 |
| | | | 455/418 |
| 2014/0328500 A1* | 11/2014 | Patwardhan | H03G 5/16 |
| | | | 381/107 |
| 2015/0106887 A1* | 4/2015 | Aslund | H04L 63/0492 |
| | | | 726/5 |

* cited by examiner

PORTABLE SPEAKER

CROSS-REFERENCE TO RELATED APPLICATION

This application is a U.S. National Stage Application of and claims priority to International Patent Application No. PCT/US2014/039502, filed on May 27, 2014, and entitled "PORTABLE SPEAKER," which is hereby incorporated by reference in its entirety.

BACKGROUND

A speaker is an electroacoustic transducer that produces sound in response to an input signal. In particular, a speaker converts received electrical signals into audible signals to be heard by an individual located proximate to the speaker. In many cases, the audible signals correspond to music the individual desires to hear. The audible signals, however, are not limited to music, and indeed often correspond to other content types such as audio books, speeches, sports programming, and the like.

Looking at the setup between the speaker and the content source (e.g., a stereo receiver), in the past, the speaker and content source were generally stationary and coupled to one another via speaker wire. Now, however, the setup has become much more flexible with the introduction of portable speakers. These portable speakers, among other things, tend to be small, lightweight, transportable, battery operated, and/or wireless-enabled. As a result, a user can, for example, move with both a portable speaker and a content source (e.g., a smartphone or tablet), and listen to audio content anywhere by wirelessly coupling the portable speaker to the content source (e.g., via a Bluetooth connection). This flexibility has caused portable speakers to gain traction in the marketplace, and it is predicted that this momentum will only continue given the prevalence of mobile computing devices.

BRIEF DESCRIPTION OF THE DRAWINGS

Examples are described in the following detailed description and in reference to the drawings, in which.

NOTATION AND NOMENCLATURE

Figure 1:
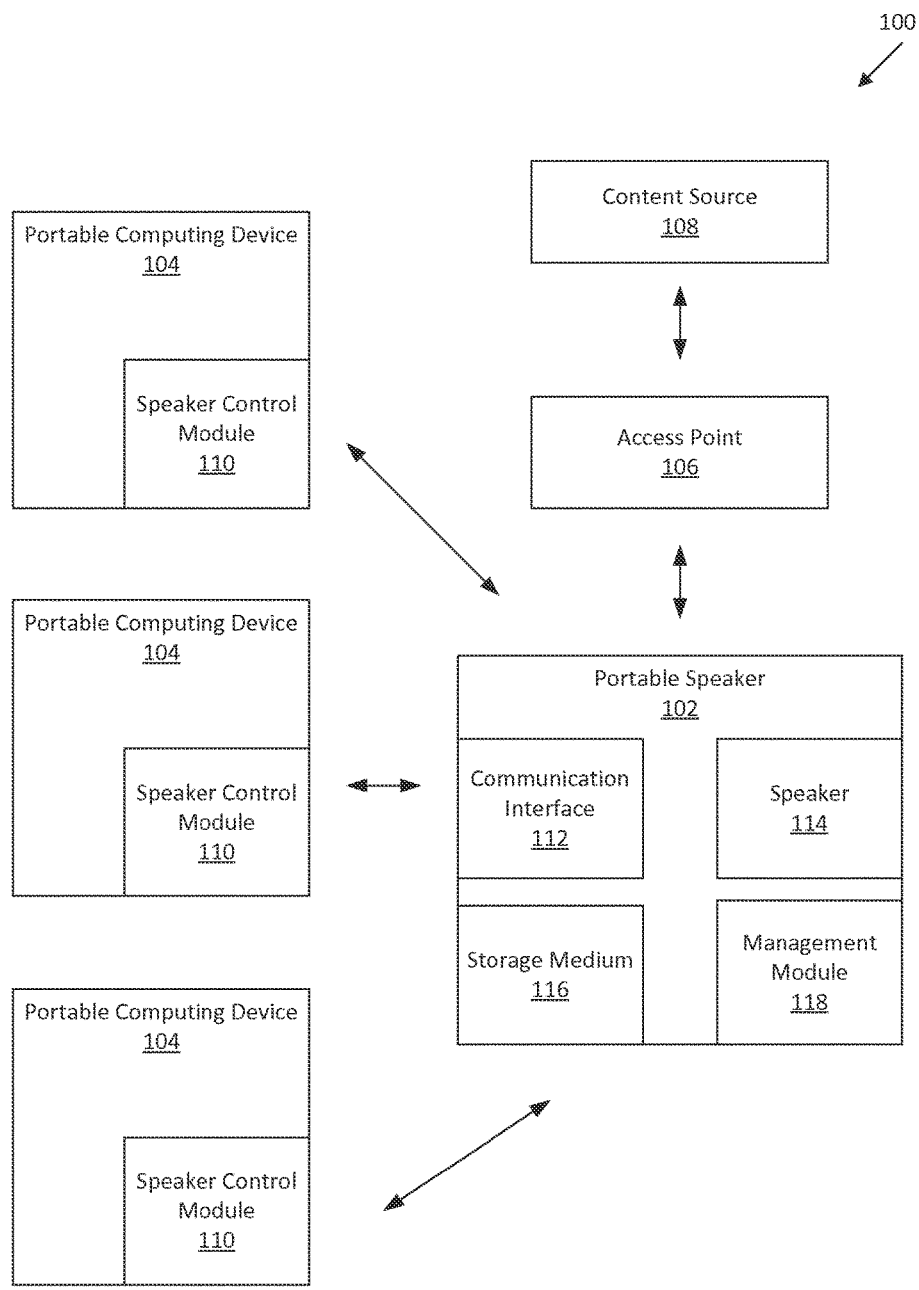
FIG. 1 depicts an example system in accordance with an implementation.

Certain terms are used throughout the following description and claims to refer to particular system components. As one skilled in the art will appreciate, technology companies may refer to components by different names. This document does not intend to distinguish between components that differ in name but not function. In the following discussion and in the claims, the terms "including" and "comprising" are used in an open-ended fashion, and thus should be interpreted to mean "including, but not limited to . . . ." Also, the term "couple" or "couples" is intended to mean either an indirect or direct connection. Thus, if a first device couples to a second device, that connection may be through a direct electrical or mechanical connection, through an indirect electrical or mechanical connection via other devices and connections, through an optical electrical connection, or through a wireless electrical connection.

Additionally, the term "portable speaker" should be understood as a powered speaker with built-in amplifier that is intended to be easily transportable. The portable speaker communicates by at least wireless communication and a wireless protocol (e.g., the Bluetooth protocol). Example portable speakers include the Beats Pill® series, Bose SoundLink® series, and Jawbone Jambox® series, and the HP® Mini Bluetooth Speaker. Furthermore, the term "portable computing device" is intended to refer to a computing device that is intended to be easily transportable and operated at various locations. Example portable computing devices include smartphones, tablets, notebooks, convertible/hybrid notebooks, all-in-one (AiO) desktops, and/or wearable computing devices such as smart watches, smart glasses, and other smart computing apparel.

Still further, the term "Internet service provider" should be understood as a provider of a service that utilizes the Internet to deliver the service. Examples in the context of the present disclosure include Pandora®, vTuner®, Slacker®, Deezer®, TuneIn®, Live365®, and Spotify®, to name a few. In addition, the term "metadata" should be understood as information describing the content and context of audio files. For example, metadata for an audio file may include information about the artist, genre, release date, title, duration, and/or album name. Finally, the term "web server" should be understood as hardware and/or software that stores, processes, and delivers web content accessible through the Internet. Examples include Apache HTTP server, LightSpeed, and NanoHTTPD.

DETAILED DESCRIPTION

As mentioned above, portable speakers are gaining traction in the marketplace due to their size, portability, and ability to communicate with portable computing devices like tablets, laptops, and smartphones.

In one common use case, a user accesses digital audio content from an Internet source provider (e.g., Pandora® or Spotify®) or from local storage on a portable computing device. The user then wirelessly streams the digital audio content from the portable computing devices to the portable speaker via a short range wireless protocol (e.g., the Bluetooth protocol), and the speaker outputs the sound corresponding to the digital audio content.

While the above-mentioned approach is suitable for many environments and situations, there are some situations and environments where the approach is not as suitable. For instance, the above-mentioned approach is not well-suited for social gatherings where a plurality of users desire to seamlessly communicate with the portable speaker regardless of their location and listen to audio content that is related and being output in a balanced manner. In particular, only a single computing device typically pairs with the portable speaker at a time, and therefore the audio content is limited to a single user's preference. Additionally, if the user desires to roam a significant distance from the portable speaker, to turn off their device, or to utilize another device function (e.g., make a phone call), the speaker output may pause or disconnect and therefore potentially disrupt a social gathering. Moreover, if the user fails to provide a continuous digital audio content stream to the portable speaker (e.g., the playlist on the portable computing device ends), the portable speaker will stop outputting, and thereby potentially interrupt the social gathering. Furthermore, if the received digital audio content comes from different sources/users, there may be variances in the audio levels which can disrupt the social gathering and/or require consistent attention to adjust the levels.

Various examples described below address at least the above-mentioned problems by providing a novel and previously unforeseen full-featured portable speaker that is tailored to provide user friendly and seamless operation at social gatherings and other events. More specifically, some examples of the present disclosure provide a portable speaker that receives audio files from a plurality of users, stores the audio files on the portable speaker, adds the audio files to a queue to be output by the speaker, normalizes the audio levels, stores metadata from the audio files in the queue, and/or automatically obtains audio content from a content source (e.g., from an Internet service provider like Pandora®) based on the metadata when the queue is empty. Among other things, this functionality may enable a plurality of users to provide audio content to the portable speaker to be played in a seamless and balanced manner without having to worry about their location with respect to the portable speaker, and without having to worry about service disruption if the queue is empty. These and other benefits are described further below with reference to various example figures and example implementations.

In particular, in one example implementation, a portable speaker is provided which includes a communication interface to receive an audio file from a portable computing device, a machine-readable storage medium to store the audio file, a speaker to output sound corresponding to the audio file, and a management module. The management module is to (i) add the audio file to a queue to be output by the speaker; (ii) analyze the audio file to determine a baseline audio level for the audio file, and utilize the determined baseline audio level to normalize an audio level of another audio file subsequently added to the queue; and (iii) in response to the number of audio files in the queue decreasing below a threshold, analyze metadata from audio files previously or currently in the queue to determine attribute information, and request audio content from an Internet service provider based on the attribute information.

In another example implementation, a portable speaker is provided which includes a communication interface to receive an audio file from a portable computing device, a machine-readable storage medium to store the audio file, a speaker to output sound corresponding to the audio file, a network server to enable configuration of the portable speaker via the portable computing device, and a management module. The management module is to (i) add the audio file to a queue to be output by the speaker; and (ii) analyze the audio file to determine a baseline audio level for the audio file, and utilize the determined baseline audio level to normalize an audio level of another audio file subsequently added to the queue, wherein the management module is to determine the baseline audio level for the audio file by at least one of identifying the loudest point in the audio file and determining the average sound level for the audio file.

In a further example implementation, a portable speaker is provided which includes a communication interface to receive an audio file from a portable computing device, a machine-readable storage medium to store the audio file, a speaker to output sound corresponding to the audio file, and a network server to enable configuration of the portable speaker via the portable computing device, wherein the configuration comprises receiving authentication information for an Internet radio service provider. The portable speaker further includes a management module to (i) add the audio file to a queue to be output by the speaker; and (ii) in response to the number of audio files in the queue decreasing below a threshold, analyze metadata from audio files previously or currently in the queue to determine attribute information, request audio content from the Internet radio service provider based on the attribute information, and cause the speaker to output the audio content received from the Internet radio service provider until another audio file is received from the portable computing device and added to the queue.

Turning now to FIG. 1, this figure depicts an example system 100 in accordance with an implementation. The system 100 comprises a portable speaker 102, a plurality of portable computing devices 104, an access point 106, and a content source 108.

Looking at the system 100 at a high level, each portable computing device 104 sends/copies entire audio files to the portable speaker 102 to be stored on the portable speaker 102 and added to a listening queue. In addition to playing the content in the listening queue, the portable speaker 102 may conduct various advanced functions such as normalizing audio levels, re-arranging/grouping content in the queue, analyzing metadata, requesting content from other content sources 108 when the queue is empty or low based on the gathered metadata, generating a service set identifier (SSID), and/or partially or completely deleting files from the portable computing device 104 once played.

More particularly, and looking closer at each device in the system 100, the portable computing devices 104 may comprise, for example, smartphones, tablets, notebooks, convertible/hybrid notebooks, all-in-one (AiO) desktops, and/or wearable computing devices such as smart watches, smart glasses, and other smart computing apparel. Each portable computing device 104 comprises a speaker control module 110. The speaker control module 110 may comprise a memory with machine-readable instructions stored thereon (e.g., a memory with a downloadable application stored thereon), which when executed, cause the portable computing devices 104 to conduct various functions.

One example function comprises sending/copying audio files to the portable speaker 102. In particular, a complete audio file is sent to the portable speaker 102 and stored on the portable speaker 102. As such, if the user were to move far away from the portable speaker 102 or turn off the portable computing device 104, the audio content would continue to play because the portable speaker 102 has a complete copy of the file and is not reliant on a continuous stream from the portable computing device 104. With regard to file types, the audio file may be .mp3, .flac, .ogg, .wav, and/or .wma, for example. With regard to communication, the portable computing device 104 may communicate with the portable speaker 102 via the Digital Living Network Alliance (DLNA) standard, Samba, or any other file transfer protocol.

Another example function of the portable computing device 104 comprises configuring aspects of the portable speaker 102. For example, a user may utilize the speaker control module 110 of the portable computing device 104 to provide authentication information for the access point 106. This authentication information may comprise a SSID and/or password for example. Additionally, the user may utilize the speaker control module 110 of the portable computing device 104 to provide authentication information for the content source 108. For example, if the content source 108 is an Internet radio service provider like Pandora® or Spotify®, the authentication information may comprise username, password, and/or other information to enable the portable speaker 102 to access the service based on the user's credentials and request content. In another example, if the content source 108 is a device such as a home server, personal computer, or other content repository, the authentication information may comprise username, password, and/or other information to enable the portable speaker 102 to access the device 108 based on the user's credentials and obtain content. As mentioned above, the portable speaker 102 may access such content sources to obtain additional audio content in the event that the queue is empty or below a predetermined threshold (e.g., the portable speaker is playing the last audio file in the listening queue). As a result, users at a social gathering can enjoy continuous audio content even if the listening queue is empty.

While the above describes configuring the portable speaker 102 via the speaker control module 110 on the portable computing device 104, this should not be viewed as limiting, as the portable speaker 102 may be configured via other approaches. For example, in some implementations, the portable speaker 102 includes an interface that enables configuration. This interface may comprise a display, touch-screen, and/or buttons on the portable speaker 102. Still further, the portable speaker 102 may be configured via a human interface device (e.g., a keyboard) coupled thereto.

Turning now to the portable speaker 102, the portable speaker 102 comprises a communication interface 112, a speaker 114, a storage medium 116, and a management module 118. It should be understood, however, that other components may be included such as, for example, a power module, a battery, a display, a processing device, an amplifier, an audio codec, and/or other components common to portable speakers 102.

The communication interface 112 may comprise, for example, a transceiver, antenna, PHY, port, and/or other communication/interface circuitry to enable the portable speaker 102 to communicate with the portable computing device 104, the access point 106, the content source 108, and/or other devices. Additionally, the communication interface 112 may comprise a wired and/or wireless communication interface. More specifically, the communication interface 112 may comprise a short range wireless interface (e.g., Bluetooth, NFC, etc.), a long range wireless interface (e.g., IEEE 802.11), and/or a wired network interface (e.g., Ethernet).

The speaker 114 may comprise, for example, a full range driver, subwoofer, woofer, mid-range driver, coaxial driver, and/or tweeter. In some implementations, a combination of the aforementioned speaker types is included in the portable speaker 102.

The storage medium 116 may comprise, for example, a non-volatile memory such as read only memory (ROM), electrically erasable programmable read only memory (EEPROM), Flash memory, hard drive, secure digital (SD) card, and emerging non-volatile memory types such as memristor, SRAM, and RRAM. The storage medium 116 stores the audio files received from the portable computing devices 104. Additionally, the storage medium 116 may store the queue depending on the implementation. Still further, since in some implementations the audio files are deleted once played but the metadata is retained at least temporarily, the storage medium 116 may store metadata associated with currently or previously stored audio files.

The management module 118, in some implementations, may comprise a memory with machine readable instructions (e.g., software, firmware, etc.) stored thereon. When executed by a processing device, the instructions cause the portable speaker 102 to perform various functions described herein. In some examples, this memory is the above-mentioned storage medium 116. In other examples, this memory is a different component and even may be integrated in the processing device. In still other implementations, the management module 118 may comprise a functionally equivalent circuit like an application specific integrated circuit (ASIC) or programmable logic device (PLD) to perform the various functions.

Looking at the management module 118 functionality, the management module 118 functions to manage the listening queue. This may comprise receiving, adding, rearranging, and/or deleting audio files from the listening queue. As mentioned above, the management module 118 may delete the audio file once played but retain the metadata at least temporarily. This metadata may be utilized to request additional similar content from a content source 108 if the listening queue is below a threshold or empty. For example, if there is one song left in the listening queue, the management module 118 may determine that the user is listening to country music based on the metadata of the last 15 songs added to the listening queue, and therefore access an Internet service provider (e.g., Pandora® or Spotify®) 108 and request a country music channel/station/feed. The management module 118 may then begin playing the music received from the content source 108 as soon as the last song in the listening queue ends so as to not cause a disruption. In the event that audio files are subsequently added to the listening queue, the management module 118 may then either interrupt the current output and begin playing the audio file added to the queue, or, alternatively, begin playing the audio file after the current track from the Internet service provider 108 ends.

Additionally, the management module 118 functions to analyze at least one received audio file to determine a baseline audio level, and utilize the determined baseline audio level to normalize the audio level of at least one audio file subsequently added to the queue. For example, the management module 118 may determine a baseline audio level of the first audio file added to the listening queue and adjust the audio level of subsequent audio files added to the queue based on the determined baseline audio level. As such, the audio level should remain constant for each file in the listening queue and therefore not fluctuate, cause disruption, or require attention. In some implementations, the management module 118 determines the baseline audio level for the audio file by at least one of identifying the loudest point in the audio file and determining the average sound level for the audio file. Furthermore, it should be understood that, in some implementations, the portable computing device 104 conduct portions of the normalization. In one particular example, the portable speaker 102 determines a baseline audio level by analyzing a first audio file. The portable speaker 102 then sends information about the baseline audio level to the portable computing device 104, and the portable computing device 104 normalizes audio levels of audio files based thereon prior to sending a copy to the portable speaker 102. Among other things, this approach may utilize the additional processing power associated with the portable computing device 104.

In addition, the management module 118 functions to re-arrange/group content in the queue. In particular, the management module 118 may group audio files in the listening queue based on genre and/or artist attributes. For example, if 10 of the 35 audio files in the listening queue are from The Beatles, the management module 118 may group these audio files together so all The Beatles songs are played consecutively. Similarly, if 10 of the 35 audio files in the listening queue are country songs, the management module 118 may group these audio files together so all country songs are played consecutively. As such, the management module 118 is able to provide a more consistent listening experience even if the audio files are not provided by the portable computing devices 104 in an organized order.

Furthermore, the management module 118 functions to generate a service set identifier (SSID) for the portable speaker 102. In particular, at a social gathering, a user may not want to share the SSID and/or password for the access point 106 with everyone at the social gathering due to privacy concerns. Therefore, the portable speaker 102 may generate its own SSID, and this SSID along with any password information may be shared with everyone so each person may connect their portable computing device 104 to the portable speaker 102 and send audio files to the speaker 102 without infringing on the host's privacy. More particularly, instead of the portable computing devices 104 connecting to the home network access point 106, the portable speaker 102, dynamically changes its Wi-Fi capability so that the portable speaker 102 becomes a Wi-Fi hotspot itself. The portable speaker 102 generates/broadcasts its own SSID for the portable computing devices 104 to connect to, and therefore this makes it easier for friends to connect their portable computing devices 104 to the portable speaker 102 SSID. In order to do so, the portable speaker 102 firmware may support Wi-Fi host functions, such as dynamic host configuration protocol (DHCP).

Turning now to other devices in FIG. 1, the access point 106 is generally a device that allows the portable speaker 102 to connect to a network such a personal area network (PAN), local area network (LAN), wide area network (WAN), and/or the Internet. The access point 106 may comprise a router and/or modem, and may interface with the portable speaker 102 via a wired/wireless connection.

Looking at the content source 108, depending on the implementation, this may be an Internet service provider, a home server, a personal computer, and/or a content repository. Regardless of the type, the content source 108 provides audio content to the portable speaker 102 when requested. In the case when the content source 108 is an Internet service provider, it may be an Internet radio service provider like Spotify®, Slacker®, Pandora®, Soma.fm®, or TuneIn®. As mentioned above, the user may provide authentication information such as a username and password to the portable speaker 102 in advance so the portable speaker 102 may access the content source when necessary.

Figure 2:
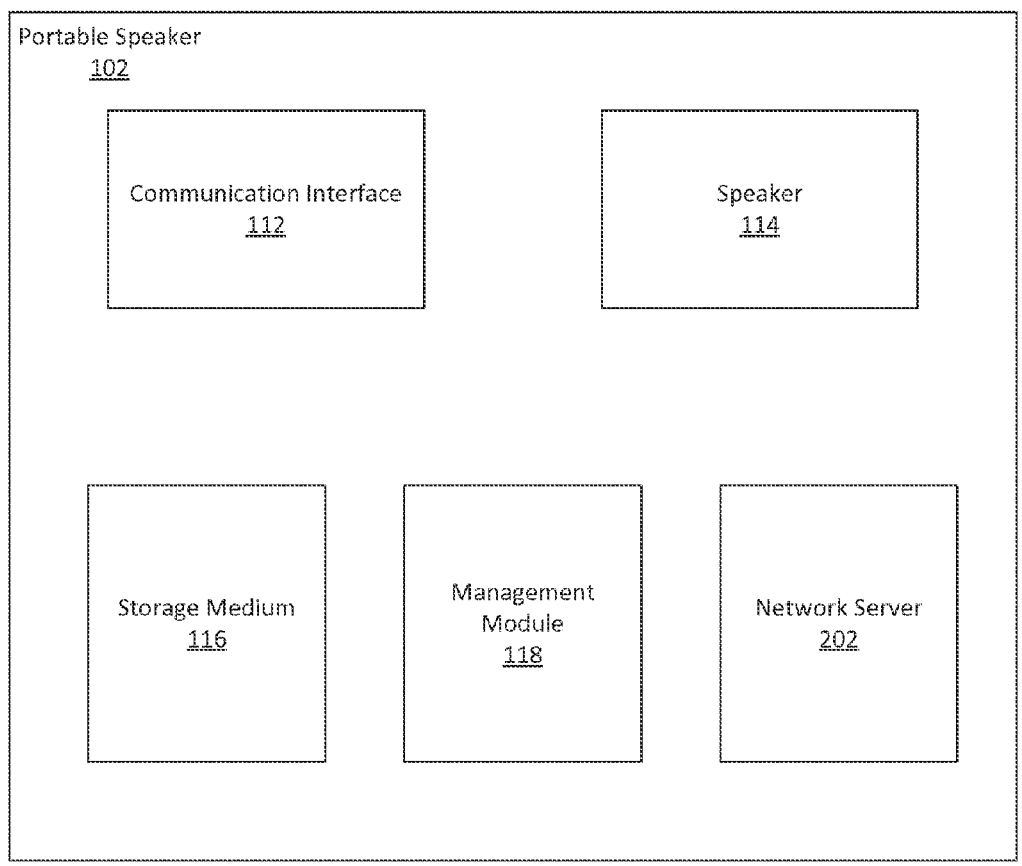
FIG. 2 depicts an example portable speaker in accordance with an implementation.

Turning now to FIG. 2, this figure depicts an example portable speaker in accordance with an implementation. In particular, the portable speaker 102 is similar to the portable speaker of FIG. 1, but with the addition of a network server 202. In some implementations, the network server 202 is a web server that stores, processes, and delivers web pages. The web server enables the portable speaker 102 to be configured by a portable computing device 104 via a web-based interface. As mentioned above, such configuration may comprise providing authentication information for the access point 106 and/or for the content source 108. For example, the configuration information may be a username, password, and/or SSID. Depending on the implementation, the web server may be a full-featured web server (e.g., the Apache HTTP server) or a lightweight web server (e.g., LightSpeed or NanoHTTPD). Regardless of the implementation, the web server 202 enables user-friendly configuration of the portable speaker 102 via a web-based interface. It should be understood, however, that the portable speaker 102 is not limited to this type of configuration, and, in some implementations, may be configured via buttons on the portable speaker 102 and/or via a keyboard coupled to the portable speaker. Moreover, it should be understood that the present disclosure is not limited to a web server, and other network services or network servers may be utilized to enable user-friendly configuration in accordance with various aspects of the present disclosure. For example, the network server 202 may be a FTP server, DLNA server, or any other network server that utilizes a protocol/mechanism to transfer data between a server and client.

Figure 3:
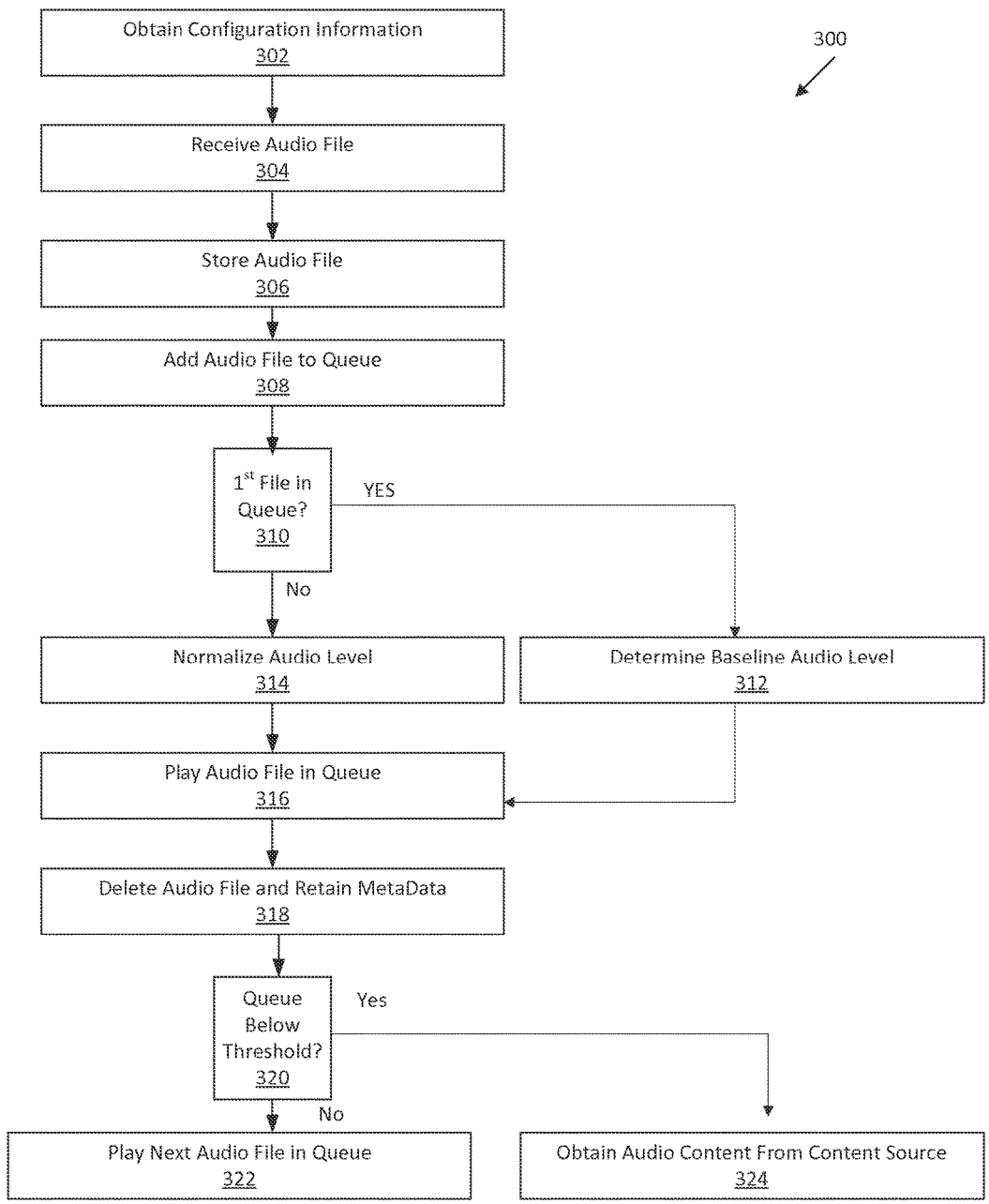
FIG. 3 depicts a process flow diagram for example portable speaker operation in accordance with an implementation.

Turning now to FIG. 3, this figure depicts a process flow diagram 300 for example portable speaker 102 operation in accordance with an implementation. It should be readily apparent that the processes depicted in FIG. 3 (as well as other process flow diagrams herein) represents generalized illustrations, and that other processes may be added or existing processes may be removed, modified, or rearranged without departing from the scope and spirit of the present disclosure. In addition, it should be understood that the processes depicted may represent instructions stored on a storage medium that, when executed, may cause the portable speaker 102 to respond, to perform actions, to change states, and/or to make decisions. Alternatively or in addition, the processes may represent functions and/or actions performed by functionally equivalent circuits like analog circuits, digital signal processing circuits, application specific integrated circuits (ASICs), or other hardware components that cause the portable speaker 102 to respond, to perform actions, to change states, and/or to make decisions. Furthermore, the flow diagrams are not intended to limit the implementation of the present disclosure, but rather the flow diagrams illustrate functional information that one skilled in the art could use to design/fabricate circuits, generate software, or use a combination of hardware and software to perform the illustrated processes.

The process 300 may begin at block 302 where the portable speaker 102 receives configuration information. As mentioned above, this configuration information may be received by the portable speaker 102 via buttons thereon, an attached keyboard, or from a portable computing device 104 coupled to the portable speaker 102. As also mentioned, the configuration information may comprise authentication information for a content source 108, authentication information for an access point 106, and/or user preference information. With regard to user preference information, this may include the user's preference with regard to groupings based on artist/genre, the particular content source 108 the user would like the portable speaker to access when the listening queue is low/empty, and/or preferred audio settings (e.g., bass, treble, and/or volume settings). In some implementations, the user preferences may be profile-based, where different preferences may be associated with different users (e.g., dad profile, mom profile, child profile, etc.).

At block 304, the portable speaker 102 receives an audio file. As mentioned above, the audio file is received from a portable computing device 104. As further mentioned, the entire audio file is received. The file may be, for example, .mp3, .flac, .ogg, .wav, and/or .wma. The file may be communicated using DLNA, for example.

At block 306, the portable speaker 102 stores the audio file. As mentioned, the audio file may be stored on a non-volatile memory within the portable speaker 102. The non-volatile memory may comprise, for example, a solid state memory (e.g., NAND flash memory).

At block 308, the audio file is added to a listening queue. In some implementations, the listening queue operates on a first-in, first-out (FIFO) basis, and therefore the audio file is added to the end of the queue. In other implementations, the listening queue is grouped based on artist/genre, and therefore the metadata of the audio file is analyzed to determine the artist/genre and the audio file is added to a point in the listening queue where similar content is located. If there is no similar content or if the user has disabled the grouping functionality, the audio file is added to the end of the queue.

At block 310, the portable speaker 102 determines if the audio file is the first audio file in the queue. If the audio file is the first in the queue, at block 312, the portable speaker determines the baseline audio level. As mentioned, the portable speaker 102 determines the baseline audio level for the audio file by at least one of identifying the loudest point in the audio file and determining the average sound level for the audio file. If the audio file is not the first in the queue, at block 314, the portable speaker 102 normalizes the audio level based on a previously determined baseline audio level. In some implementations, the applied baseline audio level for normalization has a timeout. Thus, after a predetermined timeout (e.g., 2 hours), the portable speaker 102 determines a new baseline audio level based on analyzing an audio file, uses this new baseline audio level to normalize audio levels of subsequently received audio files for the predetermined timeout period (e.g., another 2 hours).

At block 316, the portable speaker 102 plays the audio file in the queue. As mentioned, the audio file may correspond to music, audio books, lectures, or other forms of audio content. At block 318, once the audio file ends, the portable speaker 102 deletes the audio file but retains the metadata associated with the audio file. As mentioned, the metadata may be utilized by the portable speaker 102 to request similar content from a content source 108. In some implementations, the metadata is only temporarily stored before being deleted. For example, the portable speaker may only store metadata associated with the most recent 20 audio files. Alternatively or in addition, the portable speaker 102 may only store metadata until the portable speaker is powered down. Still further, in some implementations, the portable speaker may not store any metadata at all and therefore delete the entire audio file including the metadata one played at block 318.

At block 320, the portable speaker 102 determines whether the queue is below a threshold. Depending on the implementation, the threshold may be 0 (i.e., the queue is empty) or may be a high number like 2 (i.e., the queue is approaching empty). If the queue is not below the threshold, at block 322, the portable speaker 102 plays the next audio file in the queue. If, on the other hand, the queue is below the threshold, at block 324, the portable speaker 102 obtains audio content from a content source 108 and plays the audio content after the last audio file in the queue plays. As mentioned above, the content source 108 may be a local device like a PC or home server, or may be an Internet service provider like an Internet radio service provider. As further mentioned, the content from the content source may be played up until additional audio files are added to the queue.

Figure 4:
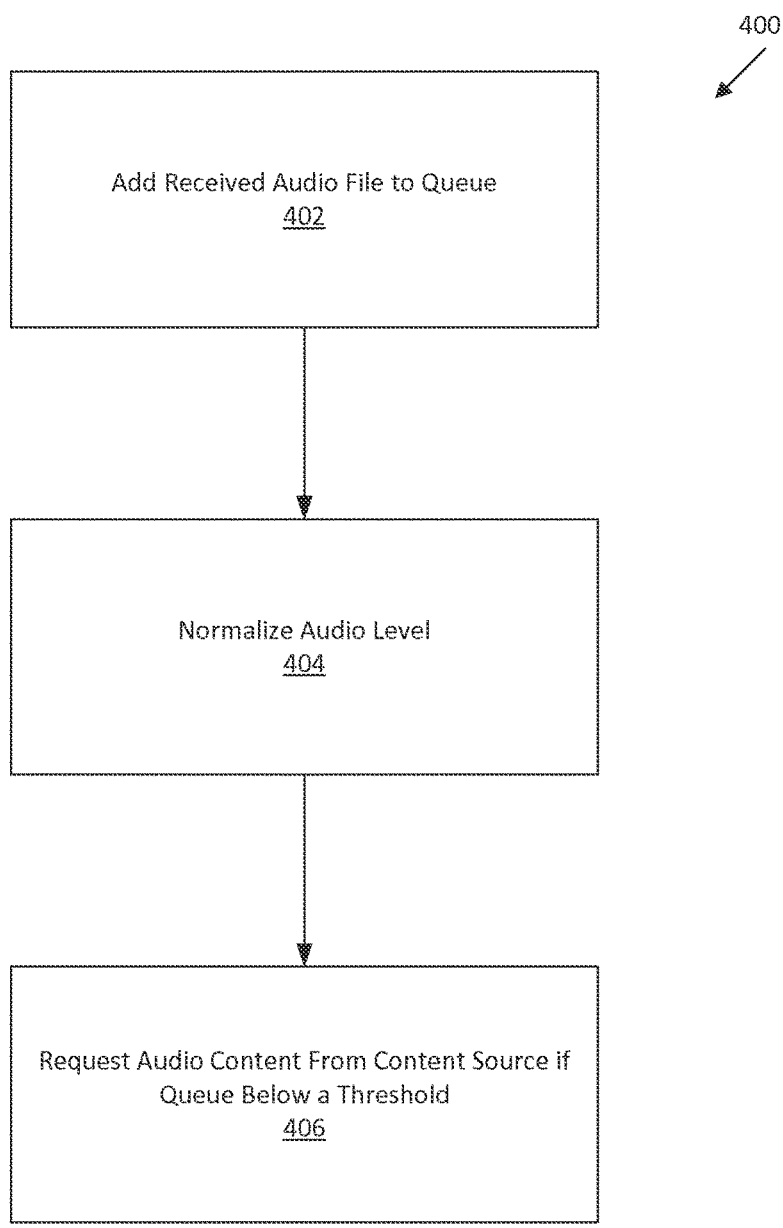
FIG. 4 depicts a process flow diagram for example portable speaker operation in accordance with another implementation.

Turning now to FIG. 4, this figure depicts a process flow diagram 400 for example portable speaker 102 operation in accordance with another implementation. The process begins at block 402, where the portable speaker 102 receives an audio file and adds it to the listening queue. At block 404, the portable speaker 102 normalizes the audio level based on a predetermined baseline audio level. At block 406, the portable speaker 102 requests audio content from a content source 108 in response to the queue falling below a threshold.

The above describes a novel and previously unforeseen approach for portable speaker operation. In particular, the foregoing describes a full-featured portable speaker which, among other things, allows a plurality of users to utilize modules on their portable computing devices to send audio files for storage within the portable speaker. This allows multiple people to select songs they think everyone will like, and essentially queue up the songs so that everyone can listen in. The file sending may utilize DLNA or Samba, and sending the entire audio file is desirable over streaming options because it frees up the portable computing device to conduct other functions (e.g., make a phone call, turn off device, etc.), and further enables the user to move out of short range wireless communication range without interrupting operation. Moreover, because the portable speaker may become a Wi-Fi hotspot itself and generate/broadcast its own SSID, a home owner does not have to give out their home networking passwords. While the above disclosure has been shown and described with reference to the foregoing examples, it should be understood that other forms, details, and implementations may be made without departing from the spirit and scope of the disclosure that is defined in the following claims.

What is claimed is:

1. A portable speaker, comprising:
    a communication interface to receive an audio file from a plurality of portable computing devices;
    a machine-readable storage medium to store the audio file;
    a speaker to output sound corresponding to the audio file; and
    a management module to:
        (i) add the audio file to a queue to be output by the speaker,
        (ii) analyze the audio file to determine a baseline audio level for the audio file, and utilize the baseline audio level that is determined to normalize an audio level of another audio file subsequently added to the queue, and
        (iii) in response to a number of audio files in the queue decreasing below a threshold, analyze metadata from audio files previously or currently in the queue to determine attribute information, and request audio content from a music channel of an Internet service provider based on the attribute information until another audio file is received from one of the plurality of portable computing devices and added to the queue.

2. The portable speaker of claim 1, wherein the Internet service provider comprises an Internet radio service provider that streams audio content based at least in part on the attribute information, and wherein the attribute information comprises at least one of: genre information or artist information.

3. The portable speaker of claim 1, wherein the communication interface is further to receive authentication information for the Internet service provider from a portable computing device of the plurality of portable computing devices, and send the authentication information to the Internet service provider.

4. The portable speaker of claim 1, wherein, after the speaker outputs the sound corresponding to the audio file, the management module is to delete a portion of the audio file from the machine-readable storage medium while at least temporarily retaining the metadata associated with the audio file in the machine-readable storage medium.

5. The portable speaker of claim 1, wherein the management module is further to determine the baseline audio level for the audio file by at least one of: identifying a loudest point in the audio file and determining an average sound level for the audio file.

6. The portable speaker of claim 1, wherein the management module is further to rearrange the audio files in the queue such that at least some audio files with similar attribute information are grouped next to each other within the queue.

7. The portable speaker of claim 1, wherein the portable speaker is to connect to an access point via the communication interface, and wherein the portable speaker is to generate its own service set identifier (SSID) different from that of the access point.

8. The portable speaker of claim 1, wherein the portable speaker further comprises a network server, and wherein the network server enables configuration of the portable speaker via a portable computing device of the plurality of portable computing devices.

9. The portable speaker of claim 1, wherein the plurality of portable computing devices comprises at least one of: a tablet, a laptop, or a smartphone.

10. A portable speaker, comprising:
a communication interface to receive an audio file from a plurality of portable computing devices;
a machine-readable storage medium to store the audio file;
a speaker to output sound corresponding to the audio file;
a network server to enable configuration of the portable speaker via a portable computing device of the plurality of portable computing devices; and
a management module to:
(i) add the audio file to a queue to be output by the speaker;
(ii) analyze the audio file to determine a baseline audio level for the audio file, and utilize the baseline audio level that is determined to normalize an audio level of another audio file subsequently added to the queue, wherein the management module is to determine the baseline audio level for the audio file by at least one of: identifying a loudest point in the audio file or determining an average sound level for the audio file; and
(iii) in response to a number of audio files in the queue decreasing below a threshold, request audio content from a music channel of an Internet service provider until another audio file is received from one of the plurality of portable computing devices and added to the queue.

11. A portable speaker, comprising:
a communication interface to receive an audio file from a plurality of portable computing devices;
a machine-readable storage medium to store the audio file;
a speaker to output sound corresponding to the audio file;
a network server to enable configuration of the portable speaker via a portable computing device of the plurality of portable computing devices, wherein the configuration comprises receiving authentication information for an Internet radio service provider; and
a management module to:
(i) add the audio file to a queue to be output by the speaker; and
(ii) in response to a number of audio files in the queue decreasing below a threshold, analyze metadata from audio files previously or currently in the queue to determine attribute information, request audio content from a music channel of the Internet radio service provider based on the attribute information, and cause the speaker to output the audio content received from the Internet radio service provider until another audio file is received from one of the plurality of portable computing devices and added to the queue.

12. The portable speaker of claim 11, wherein the Internet radio service provider streams audio content based at least in part on the attribute information, and wherein the attribute information comprises at least one: of genre information or artist information.

13. The portable speaker of claim 11, wherein, after the speaker outputs the sound corresponding to the audio file, the management module is to delete a portion of the audio file from the machine-readable storage medium while at least temporarily retaining the metadata associated with the audio file in the machine-readable storage medium.

14. The portable speaker of claim 11, wherein the management module is further to analyze the audio file to determine a baseline audio level for the audio file, and utilize the baseline audio level that is determined to normalize an audio level of another audio file subsequently added to the queue, wherein the management module is to determine the baseline audio level for the audio file by at least one of: identifying a loudest point in the audio file or determining an average sound level for the audio file.

* * * * *